United States Patent [19]

Geier

[11] Patent Number: 5,784,029
[45] Date of Patent: Jul. 21, 1998

[54] RECOGNITION OF AND METHOD AND APPARATUS FOR GPS ANTENNA LEVER ARM COMPENSATION IN INTEGRATED GPS/DEAD RECKONING NAVIGATION SYSTEMS

[75] Inventor: George Jeffrey Geier, Scottsdale, Ariz.

[73] Assignee: Motorola, Inc., Schaumburg, Ill.

[21] Appl. No.: 739,010

[22] Filed: Oct. 28, 1996

[51] Int. Cl.⁶ ............................ H04B 7/185; G01S 5/02
[52] U.S. Cl. .................................... 342/357; 701/214
[58] Field of Search .......................... 342/357, 359; 364/449.7; 701/214

[56] References Cited

U.S. PATENT DOCUMENTS

| | | | |
|---|---|---|---|
| 5,075,693 | 12/1991 | McMillan et al. | 342/457 |
| 5,272,483 | 12/1993 | Kato | 342/357 |
| 5,404,661 | 4/1995 | Sahm et al. | 37/348 |
| 5,416,712 | 5/1995 | Geier et al. | 364/450 |
| 5,438,771 | 8/1995 | Sahm et al. | 37/348 |
| 5,527,003 | 6/1996 | Diesel et al. | 244/195 |

OTHER PUBLICATIONS

"Design and Analysis of a Low Cost GPS Aided Navigation System", by James F. McLellan, A Dissertation Submitted to the Faculty of Graduate Studies, Department of Surveying Engineering, Jan., 1992.

*Primary Examiner*—Theodore M. Blum
*Attorney, Agent, or Firm*—Bradley J. Botsch, Sr.

[57] ABSTRACT

This invention reduces the error growth associated with vehicle Dead Reckoning (DR) systems utilizing heading rate sensors (15) by compensating for the lever arm or offset between the Global Positioning System (GPS) antenna (11) and the center of rotation of the vehicle. When turning at moderate speeds, the error induced in the GPS heading by this lever arm can be the dominant error effect. Accordingly, the present invention recognizes this source of error and further describes a method and apparatus for estimating and compensating for the error effect of this lever arm.

22 Claims, 4 Drawing Sheets

RECOGNITION OF AND METHOD AND APPARATUS FOR GPS ANTENNA LEVER ARM COMPENSATION IN INTEGRATED GPS/DEAD RECKONING NAVIGATION SYSTEMS

BACKGROUND OF THE INVENTION

Use of global positioning satellite (GPS) receivers in automotive navigation and tracking systems is now widespread. Systems based solely on GPS generally do not work well, however, in dense city environments, where signal blockage and reflection by tall buildings, in addition to radio frequency interference, often occurs. A cost effective solution to this problem is to augment the GPS receiver with some form of Dead Reckoning (DR), to fill in the gaps in the GPS coverage and improve the accuracy of the GPS trajectory. A DR system usually takes the form of a low cost heading rate sensor (which could be a low cost gyro or an interface to separate left and right wheel sensors installed in the vehicle), and an interface to the vehicle's odometer.

The accuracy of the DR system is critically dependent upon the accuracy to which the vehicle's heading is determined whereby each degree of heading error, in the absence of GPS, produces a cross-track position error which grows approximately as 1.7% of distance traveled. In order to achieve the most accurate heading solution possible, GPS heading information is blended with the heading maintained by the heading rate sensor.

Referring to U.S. Pat. No. 5,416,712 and "Design and Analysis of a Low Cost GPS Aided Navigation System", James F. McLelland, M. S. Thesis, Department of Surveying, University, of Calgary, Calgary, Calif., January 1992, systems are disclosed whereby the DR and GPS information is combined using a Kalman filter, which utilizes statistical representations for the sources of error in the GPS and DR system headings. However, a GPS receiver does not actually sense heading, but derives heading from the determined east and north velocity components of the antenna. Further, when turning, the velocity components do not correspond to the true heading of the vehicle, due to the lever arm between the GPS antenna and the vehicle's center of rotation thereby inducing a substantial source of error. The present invention recognizes this source of error in the GPS heading which can substantially contribute to error in the derived heading information.

Hence, what is needed is an apparatus and method that recognizes this error due to the lever arm between the GPS antenna and the vehicle's center of rotation and effectively estimates and removes such error induced by this lever arm.

DETAILED DESCRIPTION OF THE DRAWING

The present invention includes an algorithm mechanized in software which can significantly enhance the performance of integrated GPS/DR systems. This algorithm automatically compensates for the offset, or lever arm, between the GPS antenna and the center of rotation of the vehicle, by estimating this offset in real-time, and correcting subsequent GPS derived headings for this error effect. When the host vehicle is turning at moderate speeds, the effect of the lever arm on the GPS heading can be the dominant error effect such that, without compensation, it will induce a significant heading error (up to twenty degrees) into the integrated system each time the vehicle turns. This heading error translates directly into cross-track positioning error as the vehicle moves forward whereby each degree of heading error produces a cross-track position error of roughly 1.7% of distance traveled. Thus, twenty degrees of error would produce more than thirty meters of cross-track position error after only one hundred meters of distance traveled. However, use of the present invention for compensating the error due to this lever arm removes such error effect and substantially increases the accuracy of the integrated GPS/DR system.

Figure 1:
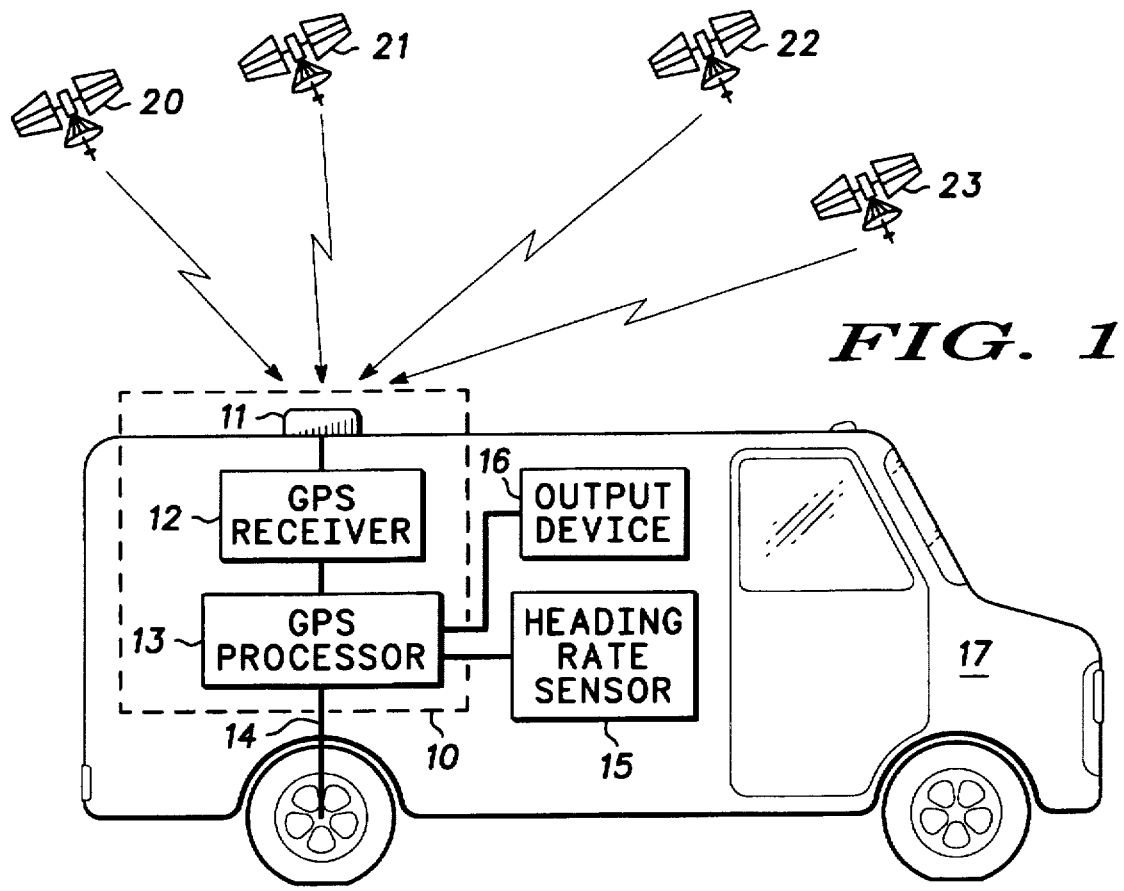
FIG. 1 is a detailed block diagram illustrating a vehicle equipped with a GPS receiver and a dead reckoning system, in accordance with the present invention.

FIG. 1 illustrates a GPS/DR system installed in a movable vehicle 17 which makes use of the present invention. FIG. 1 includes a GPS receiver 10 for receiving GPS signals including a GPS antenna 11 and a GPS processor 13, for tracking GPS satellites in view (20, 21, 22, and 23) and deriving range and range rate measurements through appropriate GPS receiver signal processing. These measurements are used to compute the position and velocity of the vehicle 17 in the processor 13.

Processor 13 also accepts inputs of distance traveled from the vehicle's odometer 14, and heading rate information from external source of heading 15. The external source of heading 15 is a heading rate sensor which may take the form of, for example, a rate gyro which senses heading rate directly, or separate wheel speed sensors installed on the left and right wheels of the vehicle whose differential speed could be used to determine heading rate. An output device 16 may be present in vehicle navigation systems for display of the vehicle position on a map. The software which implements the antenna offset calibration is resident in the GPS processor 13. This software (to be described in more detail hereinafter) makes use of a Kalman estimator for the lever arm, which is modeled as an unknown (i.e., random) bias error with an uncertainty level which reflects typical vehicle dimensions (e.g., one meter). The Kalman measurement is constructed from a residual between the GPS derived heading and an open loop propagation using the dead reckoning system sensed heading changes. This open loop propagation is initiated each time the vehicle turns.

Generally, the GPS antenna can be placed anywhere on the host vehicle, but typical automotive installations are generally installed (i) inside the front or rear windows, (ii) on the roof above the passenger compartment, (iii) above the vehicle's trunk, or (iv) on the front hood. The selection is generally up to the automotive manufacturer, but some installations are discouraged. For example, installations inside the vehicle will lead to GPS significant signal attenuation and loss. Unfortunately, installations most favorable to GPS signal tracking often have the largest lever arm associated with them. For example, an installation close to the rear of the car (over the trunk), as is the case for the Ford Remote Emergency Service Control Unit (RESCU) system, has the largest lever arm. The rear of the vehicle could be 1.5 meters away from the center of rotation of the vehicle (i.e., the point of the vehicle which does not experience any lateral motion when turning).

Figure 2:
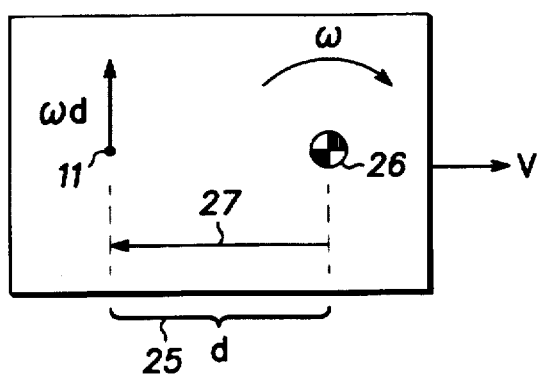
FIG. 2 is a pictorial diagram illustrating the effect which the GPS antenna lever arm has on the GPS determined heading, in accordance with the present invention.

In FIG. 2, the relationship between the GPS antenna lever arm 25, the center of rotation 26 of the vehicle, and the resultant GPS heading error (given by the Eqn. 1 below) are illustrated. FIG. 2 shows that when the vehicle makes a turn, a velocity component ($\omega$d) associated with the GPS antenna exists when the GPS antenna is not on the vehicle's center of rotation. This velocity component is orthogonal to the lever arm directional vector 27 that is created from the vehicle's center of rotation to the location of the antenna on the vehicle. When estimating the lever arm 25 and compensating therefor, the error build-up associated with the integrated system during turns can be reduced, and variations in the offset across different vehicle types can be removed. As illustrated in FIG. 2, the GPS heading develops an error term proportional to the lever arm 25 multiplied by the angular rate of the vehicle. For a 1 meter lever arm 25, and a vehicle turning a corner ($\omega$=25 deg/sec) at roughly a velocity (v) of 5 mph, an error ($\Delta H_{GPS}$) of 14 degrees results in the GPS determined heading, as given by Eqn. 1.

$$\Delta H_{GPS} = -\tan^{-1}(\omega d/v) \quad (1)$$

where
 $\omega$ represents the angular velocity component;
 d represents the lever arm distance;
 v represents the velocity of the host vehicle; and
 whereby the product $\omega$d represents the instantaneous velocity component of the GPS antenna which is orthogonal to the lever arm directional vector.

At this speed and assuming a reasonable satellite geometry, the effect of Selective Availability (generally the largest error component of the GPS determined heading) is 2.5 degrees. Thus, the heading filter, which blends the GPS and DR headings, will not expect such an error magnitude, and a statistical rejection of the GPS heading may occur in a Kalman filter implementation. Such a statistical rejection, while it protects the heading estimate from the effects of the lever arm, allows the DR system heading to drift since GPS heading information is ignored. The present invention, however, since it removes the effects of the lever arm on the GPS headings, allows processing of the (compensated) GPS headings to continue. If a statistical rejection does not occur, a component of the lever arm induced error can leak into the heading estimate, and produce significant cross track position error.

The present invention recognizes this error due to the lever arm and, accordingly, estimates this error and removes it thereby increasing the accuracy of the heading estimate of the system.

The lever arm (d) may be estimated by measuring its effect on the difference between the GPS and DR integrated system propagated heading residuals ($H_{res}$) whereby subsequent refinements to the estimated lever arm (d) are computed by filtering each measured value ($\Delta d_{meas}$) using low pass or Kalman filtering.

Referring to Eqn. 2, an equation for measuring the correction ($\Delta d_{meas}$) with respect to the current estimated lever arm (d) is shown whereby $\Delta d_{meas}$ is subsequently used, as shown in Eqn. 5 below, to refine the estimate of the lever arm d.

$$\Delta d_{meas} = (v/\Delta H_{DR}) H_{res} \quad (2)$$

where:
 $H_{res} = H_{DR} - [H_{GPS} - \Delta H_{DR}(d/v)]$;
 $H_{DR}$ is open loop DR system determined heading;
 $H_{GPS}$ is the GPS determined heading;
 $\Delta H_{DR}$ is the DR system determined heading change;
 and v is the DR system determined velocity.

Note that the heading residual term Hres includes the term $[\Delta H_{DR}(d/v)]$, which is subtracted from the GPS determined heading ($H_{GPS}$), for compensating the heading residual from the effects of the lever arm whereby if the lever arm is accurately estimated or measured, then error effects on the heading that are due to the lever arm may be minimized. Further, it is noteworthy that $\Delta d_{meas}$ represents a measurement of the adjustment to the current estimated lever arm (d), which is removed from the heading residual (Hres). Therefore, as the estimated lever arm approaches the true lever arm distance, $\Delta d_{meas}$ approaches zero.

Eqn. 2 is most useful for measuring the lever arm when a sufficient heading change has accumulated, to reduce the effects of the errors in the GPS and DR determined headings upon the lever arm measurement. However, if a Kalman filter, typically located in the GPS processor 13, is used to estimate $\Delta d$ from the time history of measured values ($\Delta d_{meas}$), then measurements corresponding to smaller heading changes can be deweighted. Further, if a simpler, low pass filter is used, only measurements corresponding to a minimum heading change should be used. Thus, the Kalman filter should perform better than the simple low pass filter, since it can weight the measurement data appropriately (the simpler, low pass filter will weight all measurements equally) and converge to an accurate solution faster. Note that the DR heading used in Eqn. 2 is an "open loop" propagation of the DR determined heading rate from the initiation of the turn, to avoid its contamination by the lever arm error.

Figure 3:
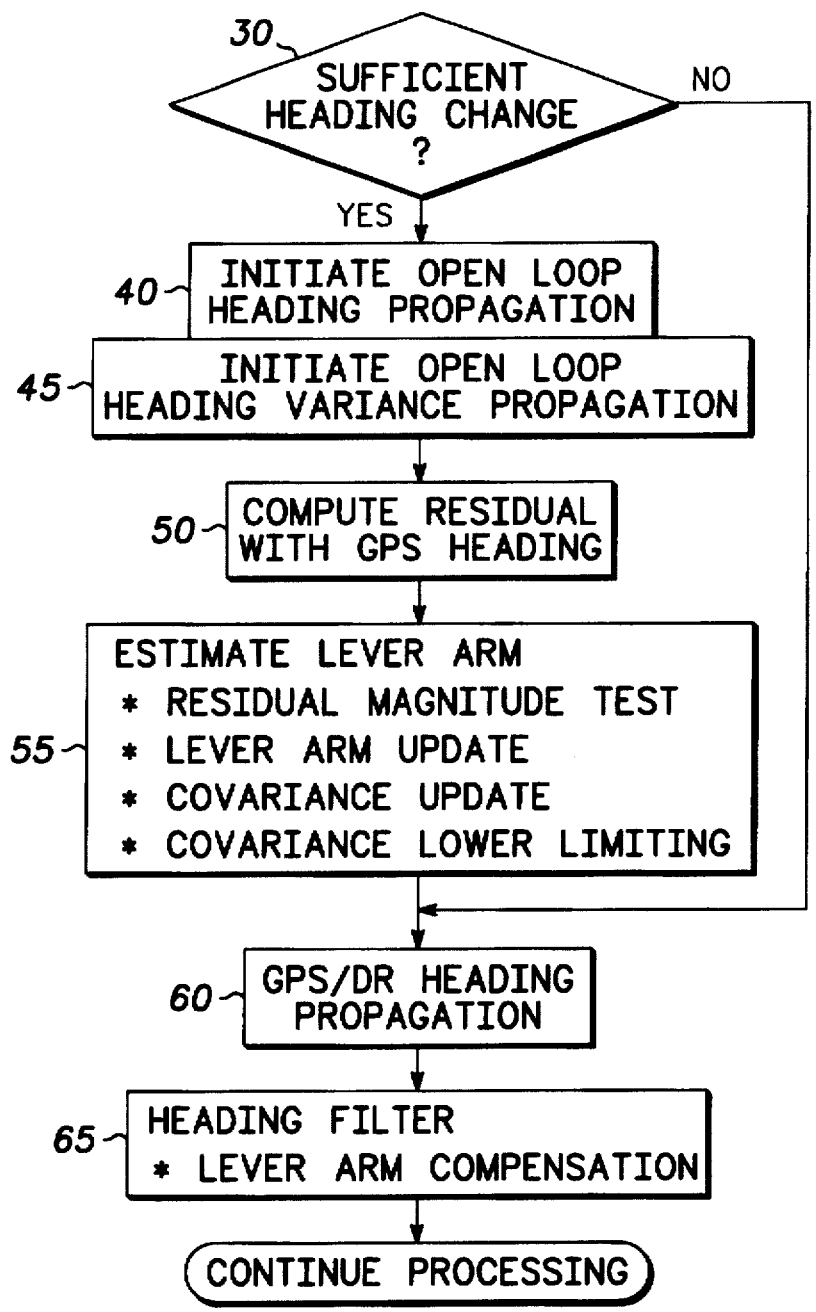
FIG. 3 is a detailed flow chart illustrating the lever arm estimation and compensation algorithm, in accordance with the present invention.
Figure 4:
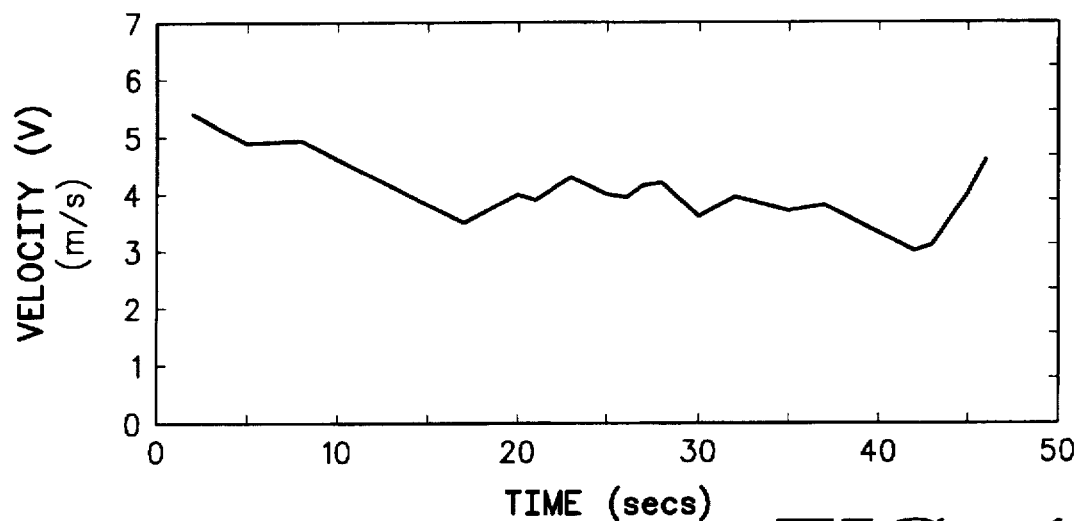
FIGS. 4 and 5 are graphical diagrams illustrating the vehicle's speed and heading, respectively, for a trajectory used to test the effectiveness of the antenna lever arm estimation scheme for a GPS antenna located forward of the center of rotation of the vehicle.

Referring to FIG. 3, a detailed flow chart illustrating the lever arm estimation and compensation process, which may be implemented in software stored within processor 13, is shown. Since a Kalman filter approach is preferred, the flowchart depicted in FIG. 3 represents the Kalman filter method.

First, a test on the magnitude of the DR determined heading change is used to activate the lever arm Kalman filter, as represented by diamond 30. If the test fails, normal processing is resumed with the GPS I DR heading propagation, as represented by box 60, and the GPS/DR heading filter which will compensate its residual using the estimated lever arm, as represented by box 65.

An open loop propagation of heading is initiated as the first step in the lever arm estimation, as represented by box 40. This open loop propagation is typically based solely on the outputs of the DR system, i.e., DR sensed heading changes, without use of GPS heading information. This preserves the independence of the DR trajectory from the antenna lever arm effect, and so enhances its observability when it is compared with the GPS heading. An open loop heading error variance ($\sigma^2_{HOL}$) is also determined, as represented by box 45. This error variance, typically computed by a dead reckoning system heading filter, includes the effects of the errors in the DR sensed heading change, including the effects of the gyro scale factor and bias drift errors for gyro based DR systems, or pulse quantization and differential scale factor errors in DR systems based on differential odometry.

The GPS heading residual (Hres), as defined by Eqn. 2, forms the basic measurement for the Kalman filter, as represented by box 50. In order to derive an estimate of the lever arm from the residual time history, the filter requires a statistical model of the accuracy of the propagated heading, the initial uncertainty associated with the lever arm, and the accuracy of the GPS determined heading (excluding the effects of the lever arm). Assuming that a Kalman filter approach has been used to integrate the DR and GPS headings, the accuracy of the propagated (i.e., open loop) heading can be predicted from that Kalman filter's error variance, as denoted by $\sigma^2_{HOL}$. Similarly, the Kalman heading filter will associate an error variance with the GPS heading, $\sigma^2_{HGPS}$. These error variances comprise the error variance associated with the lever arm measurement, as denoted by $\sigma^2\Delta d_{meas}$, and are computed according to Eqn. 3.

$$\sigma^2\Delta d_{meas}=(v/\Delta H_{DR})^2(\sigma^2_{HOL}+\sigma^2_{HGPS}) \quad (3)$$

The GPS heading residual determined from box 50 is subjected to a reasonableness test before it is used to update the lever arm, to guard against excessive errors in the GPS heading (e.g., as could arise from tracking reflected signals). The measurement error variance given by Eqn. 3 is used to determine the Kalman gain ($k_{gain}$), as computed in Eqn. 4, to apply to the current measurement.

$$k_{gain}=\sigma^2_d/(\sigma^2_d+\sigma^2(\Delta d_{meas})) \quad (4)$$

where $\sigma^2_d$ is the error variance associated with the estimated lever arm d.

Given the Kalman gain, $k_{gain}$, the lever arm estimate, d, is updated according to Eqn. 5.

$$d=d+\Delta d=d+k_{gain}\Delta d_{meas} \quad (5)$$

Following the update, the error variance associated with the lever arm estimate is likewise updated according to Eqn. 6.

$$\sigma^2_d=(1-k_{gain})\sigma^2_d \quad (6)$$

The lever arm is initialized to zero, since no prior estimate is available, and its error variance is initialized to a value representative of automotive dimensions (e.g., 1 meter$^2$). Since the lever arm is modeled as a random bias (i.e., there are no dynamics associated with the lever arm), a lower limit should be imposed on $\sigma^2_d$ to avoid possible numerical problems.

Figure 5:
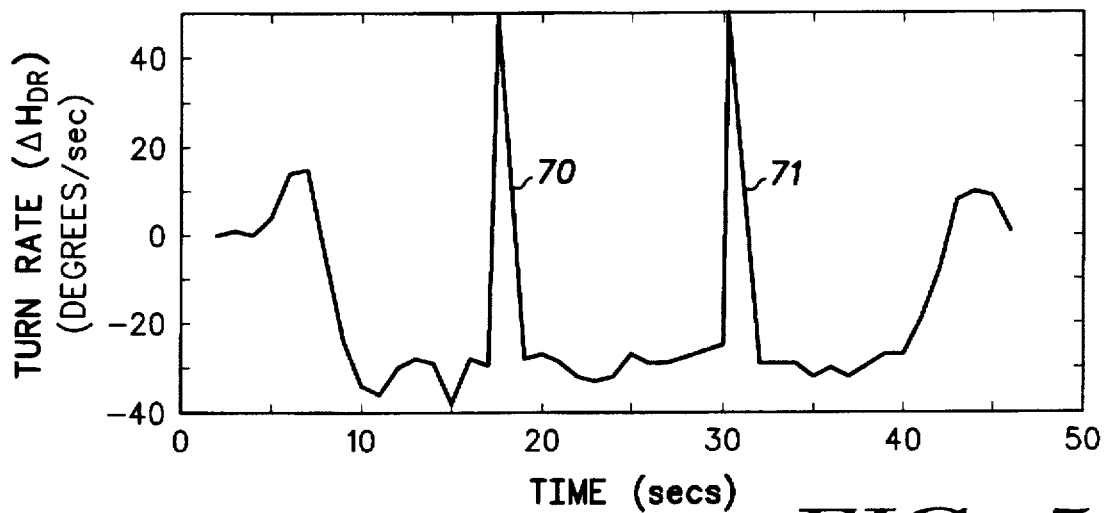
Figure 6:
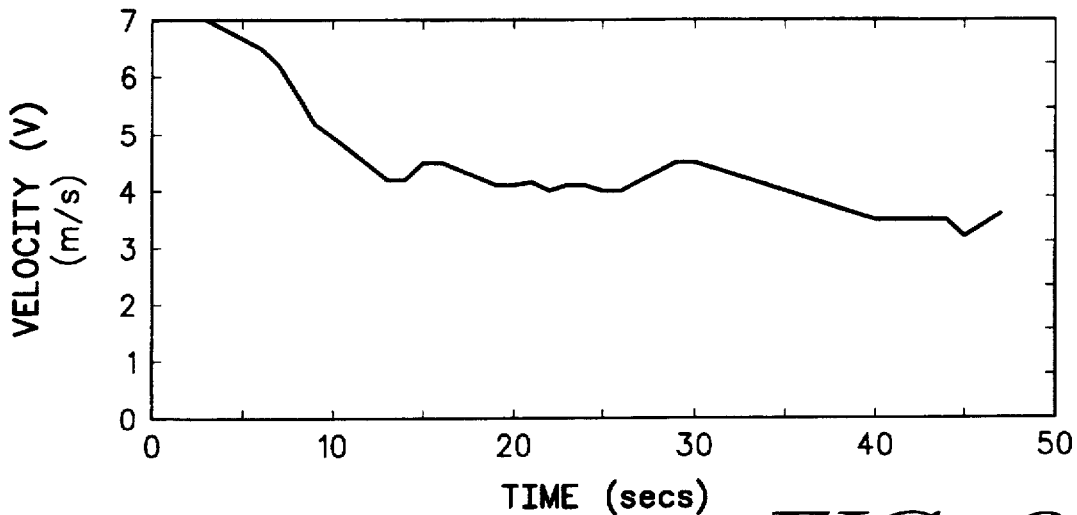
FIGS. 6 and 7 are graphical diagrams illustrating the vehicle's speed and heading, respectively, for a trajectory used to test the effectiveness of the antenna lever arm estimation scheme for a GPS antenna located roughly at the center of rotation of the vehicle.
Figure 7:
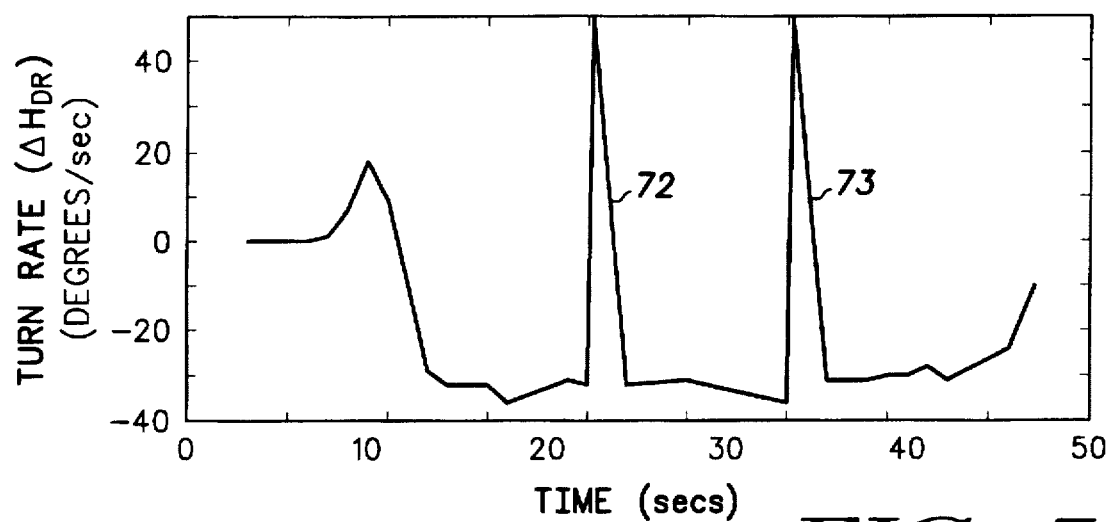

As a proof of concept of the present invention, two tests were performed to demonstrate the effectiveness of the present invention's lever arm estimator. The first test involved placing the GPS antenna forward of what was believed to be the center of rotation of the vehicle (i.e., just ahead of the test vehicle's sunroof) while the second test involved placing the GPS antenna closer to what was believed to be the center of rotation of the vehicle (i.e., just behind the test vehicle's sunroof). For each test, the test vehicle traversed three counterclockwise circles at an average speed of roughly 10 miles per hour, and a heading rate of roughly 30 degrees per second whereby spikes 70 and 71 (of FIG. 5) and spikes 72 and 73 (of FIG. 7) represent a 0 to 360 degree transition change in heading where heading is constrained between 0 to 360 degrees. For each test, it was expected that the lever arm would have a significant effect on the heading residual.

The speed and turn rate profiles for each test are illustrated in FIGS. 4–7 whereby the horizontal axis represents time in seconds and the vertical axis represents either the speed (V) in meters/second, or the DR turn rate ($H_{DR}$) in degrees/second. In the first test, corresponding to a roughly circular trajectory with vehicle speed and turn rate profiles illustrated by FIGS. 4 and 5, respectively, the GPS antenna was placed forward of what was believed to be the center of rotation of the vehicle (i.e., just ahead of the test vehicle's sunroof). For the second test, corresponding to a roughly circular trajectory with vehicle speed and turn rate profiles illustrated by FIGS. 6 and 7, the GPS antenna was placed closer to what was believed to be the center of rotation (i.e., just behind the test vehicle's sunroof).

Figure 8:
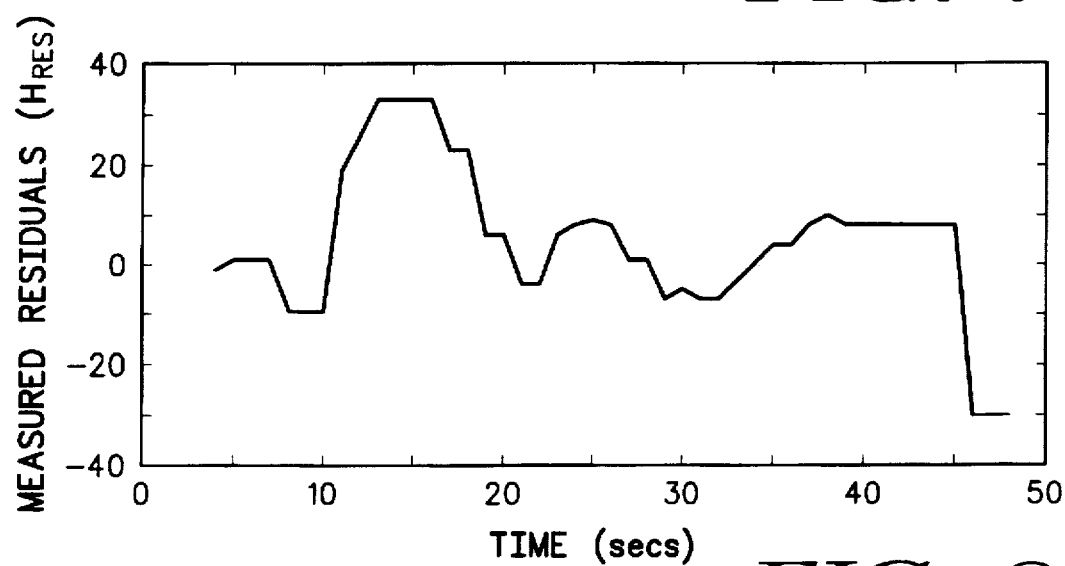
FIGS. 8 and 9 are graphical diagrams illustrating the heading filter residuals used to estimate the antenna lever arm.
Figure 9:
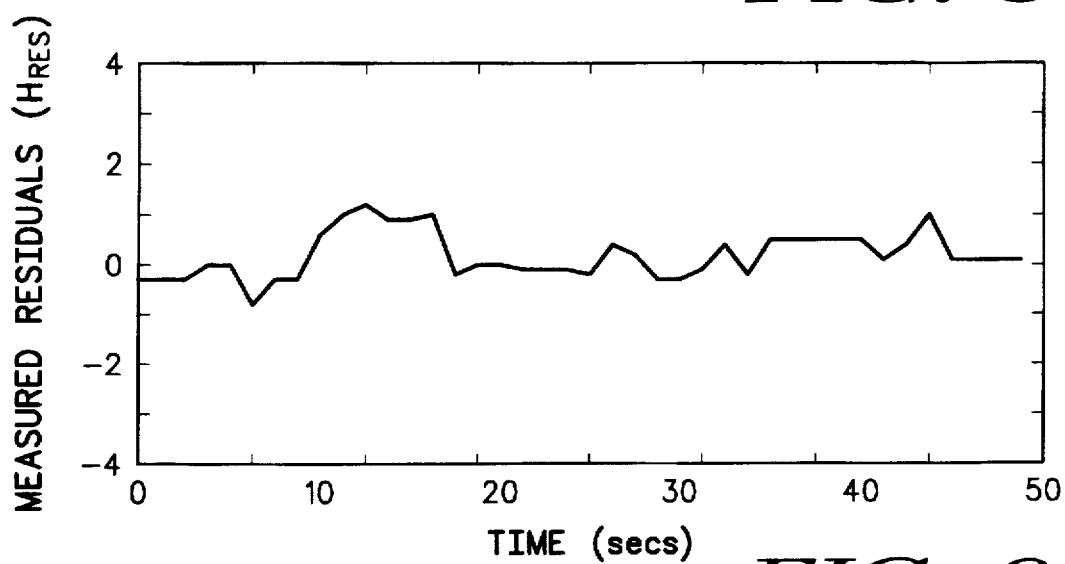

FIGS. 8 and 9 represent the residuals observed for tests 1 and 2 whereby the horizontal axis represents time in seconds and the vertical axis represents the measured residuals (Hres) of the heading filter which processes the GPS headings. In FIG. 8, corresponding to the first test, relatively large residuals were observed (because the lever arm distance d was relatively larger than in test 2), leading to several statistical rejections by the heading filter. On the other hand, the residual history shown in FIG. 9 is generally of smaller magnitude (because the lever arm distance d was relatively smaller than in test 1), and no statistical rejections were observed. From each residual plot, a rough estimate of the lever arm was computed from the residual average, using Eqn. 2. These rough estimates for the lever arm, d, for each test are given in Table 1.

TABLE 1

| GPS Antenna Lever Arm Estimates (d) | |
| --- | --- |
| Circle Test 1 | Circle Test 2 |
| 28.74 inches | 9.84 inches |

The results agreed with intuition, in that it was expected that the antenna was closer to the center of rotation for the second test than in the first test. To further confirm the results, the length of the vehicle's sunroof was measured as 22.5 inches. Note that this measured difference matches the difference between the lever arm estimates very well whereby the lever arm difference, from Table 1 above, is 18.90 inches (28.74–9.84). This indicates that the lever arm has been estimated to an accuracy of better then 4 inches. In a Kalman filter implementation as described in the flow chart of FIG. 3 (as opposed to the rough estimate made with respect to tests 1 and 2), the accuracy would continue to improve until a predetermined lower accuracy limit had been reached (e.g., 0.5 inches). When the estimate reaches this accuracy level, as determined from the error variance of the Kalman filter ($\sigma^2_d$ of Eqn. 6), the effect of the lever arm as an error source in the integrated system has effectively been removed.

Although the real-time estimation and calibration of the GPS antenna lever arm has been described as the preferred embodiment, at least two additional alternatives exist. These alternatives include (i) simply deweighting GPS headings by the expected magnitude of the lever arm, and (ii) compensating for the lever arm effect using a predetermined value for its magnitude.

The first alternative will use a value for the lever arm magnitude which is conservative (i.e., greater than or equal to the actual value), and compute its effect on each GPS heading using Eqn. 1. The resultant GPS heading error magnitude will then be used by the heading filter (which blends GPS and DR information) to increase the GPS heading measurement error variance (i.e., to represent the effects of the lever arm induced error as an additional white noise error source in the GPS heading). In this way, GPS headings will effectively be ignored by the integrated system when the lever arm effect is dominant.

The second alternative performs the lever arm compensation of the GPS heading, but does not estimate the lever arm in real-time. Rather, it uses a predetermined, or measured value, determined when the GPS antenna is installed in the vehicle by measuring its distance from the (known) center of rotation of the vehicle. In this manner, the present invention encompasses compensating for the effect of the GPS antenna lever arm independent of whether the lever arm distance d is first measured using Eqns. 2–6, or whether the lever arm distance is manually, or otherwise, determined.

By now it should be apparent that a novel technique and method has been provided that first recognizes the effect that a GPS antenna lever arm may have on GPS heading estimates when turning. Further, the present invention offers an approach based on a GPS and DR integrated system to estimating this lever arm on a real-time basis which is especially useful when the center of rotation of the vehicle is unknown, or alternately, the lever arm may be manually measured if the center of rotation of the vehicle is already known. Additionally, the present invention compensates the error effect of such lever arm by subtracting or removing the heading rate component due to the lever arm ($\Delta H_{DRx}(d/v)$) from the DR heading residual (Hres).

While the invention has been described in conjunction with specific embodiments thereof, many alternatives, modifications and variations will be apparent to those of ordinary skill in the art in light of the foregoing description. Accordingly, the invention is intended to embrace all such alternatives, modifications and variations as fall within the spirit and broad scope of the appended claims.

I claim:

1. A method for improving the heading of a global positioning satellite (GPS) receiver installed on a movable vehicle, the GPS receiver including a GPS antenna for receiving GPS signals, the method comprising the steps of:

recognizing that when the movable vehicle is turning the GPS antenna has a velocity component not aligned with a velocity of the movable vehicle when the GPS antenna is offset relative to a center of rotation of the vehicle;

recognizing that said velocity component of the GPS antenna causes error in heading of the GPS receiver; and compensating the heading of the GPS receiver based upon the recognition of said velocity component of the GPS antenna using an external source of heading.

2. The method of claim 1 further including the step of determining a lever arm distance of the GPS antenna relative to said center of rotation of the movable vehicle.

3. The method of claim 2 further including the step of compensating the heading of the GPS receiver based upon said lever arm distance.

4. The method of claim 2 wherein the step of determining said lever arm distance includes estimating said lever arm distance based upon heading information from said external source of heading.

5. The method of claim 4 wherein the step of estimating said lever arm distance includes using a kalman filter.

6. The method of claim 4 wherein the step of estimating said lever arm distance includes using a low pass filter.

7. The method of claim 2 wherein the step of determining said lever arm distance includes measuring said lever arm distance.

8. The method of claim 1 wherein said external source of heading includes a gyro.

9. The method of claim 1 wherein said external source of heading includes wheel sensors coupled to the vehicle.

10. The method of claim 1 wherein said compensating the heading of the GPS receiver includes deweighting GPS heading information when said external source of heading detects a substantial change in heading.

11. An apparatus for compensating for heading error effects in a global positioning satellite (GPS) receiver residing on a movable vehicle caused by a GPS antenna being offset relative to a center of rotation of said movable vehicle, said apparatus comprising:

an external source of heading for sensing heading changes of said movable vehicle;

means for determining a heading residual between a GPS heading derived from said GPS receiver and a heading based on said external source of heading;

means for determining a lever arm distance that said GPS antenna is offset relative to the center of rotation of said movable vehicle using said heading residual; and means for compensating said GPS heading from error induced by said GPS antenna being offset relative to the center of rotation of said movable vehicle using said determined lever arm distance.

12. The apparatus of claim 11 wherein said means for compensating includes means for deweighting GPS heading information when said external source of heading detects a substantial change in heading.

13. The apparatus of claim 11 wherein said external source of heading includes a gyro.

14. The apparatus of claim 11 wherein said external source of heading includes wheel sensors coupled to said movable vehicle.

15. Apparatus for compensating for heading error effects in a global positioning satellite (GPS) receiver installed on a movable vehicle, said heading error effects caused by a GPS antenna being offset relative to a center of rotation of the movable vehicle, the apparatus comprising:

an external source of heading for sensing heading changes of said movable vehicle;

means for determining a heading residual between a GPS heading derived from said GPS receiver and a heading based on said external source of heading;

means for determining a lever arm distance that said GPS antenna is offset relative to the center of rotation of said movable vehicle; and means for compensating GPS heading based upon said determined lever arm distance.

16. The apparatus of claim 15 wherein said means for determining a lever arm distance including means for estimating said lever arm distance using heading information based on said external source of heading.

17. The apparatus of claim 15 wherein said means for determining a lever arm distance including means for measuring a distance from said GPS antenna to said center of rotation of said vehicle.

18. The apparatus of claim 15 wherein said means for compensating includes means for deweighting said GPS heading information when said external source of heading detects a substantial change in heading.

19. The apparatus of claim 18 wherein said means for compensating further includes a kalman filter for deweighting said GPS heading information.

20. The apparatus of claim 18 wherein said means for compensating further includes a low pass filter for deweighting said GPS heading information.

21. The apparatus of claim 15 wherein said external source of heading includes a gyro.

22. The apparatus of claim 15 wherein said external source of heading includes wheel sensors coupled to said movable vehicle.

* * * * *